United States Patent [19]

Davis

[11] 4,361,937

[45] Dec. 7, 1982

[54] CABLE BANDING LOCK RING

[76] Inventor: C. Arthur Davis, Rte. 6, Box 137, Ada, Okla. 74820

[21] Appl. No.: 211,317

[22] Filed: Nov. 28, 1980

[51] Int. Cl.³ .............................................. A43C 11/00
[52] U.S. Cl. .................................. 24/68 PP; 24/257; 174/47
[58] Field of Search ............... 24/339, 257, 259 R, 24/198, 199, 200, 265 CD, 68 PP; 174/40 CC, 41, 47; 166/65 R; 248/49; 403/392, 396, 398

[56] References Cited

U.S. PATENT DOCUMENTS

| | | | |
|---|---|---|---|
| 1,836,959 | 12/1931 | Domkee | 24/200 |
| 3,197,829 | 8/1965 | Caveney et al. | 174/40 CC |
| 3,331,105 | 7/1967 | Gordon | 24/16 PB |
| 3,556,454 | 1/1971 | Huver | 24/257 |
| 4,077,091 | 3/1978 | Liljedahl | 24/198 |

FOREIGN PATENT DOCUMENTS

| | | | |
|---|---|---|---|
| 842509 | 6/1952 | Fed. Rep. of Germany | 403/390 |
| 77387 | 3/1960 | France | 24/198 |

Primary Examiner—Robert A. Hafer
Attorney, Agent, or Firm—Allen A. Dicke, Jr.

[57] ABSTRACT

When a submerged pump is supported on its discharge pipe in a deep well, such as an oil well, the electric power supply cable to the pump is strapped to the side of the discharge pipe. The cable banding lock ring engages around the strap between the cable and discharge pipe to increase the wrap of the strap around both the power supply cable and the discharge pipe.

6 Claims, 5 Drawing Figures

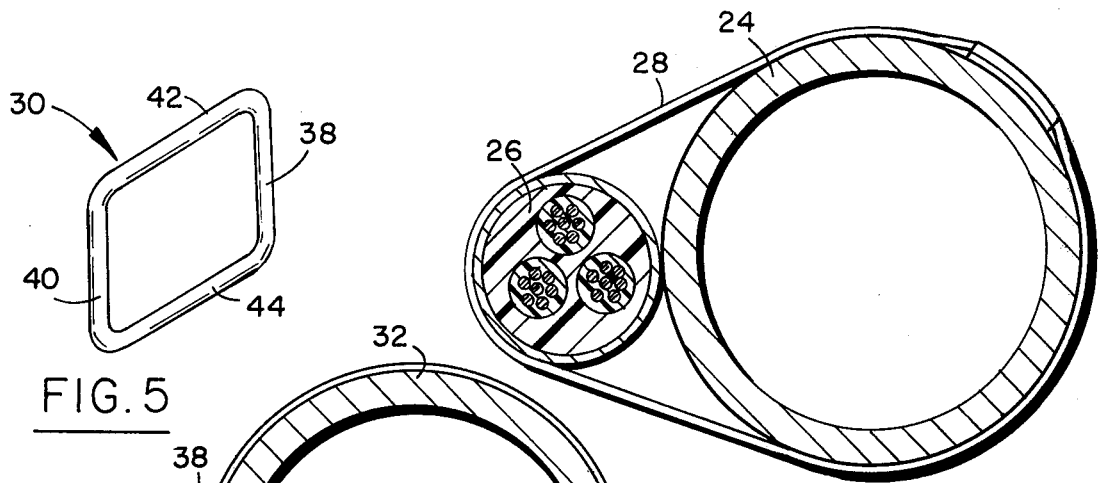
FIG. 2
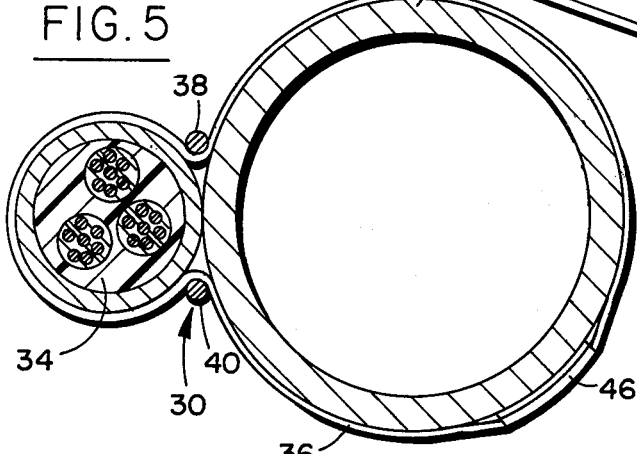
FIG. 5
FIG. 3
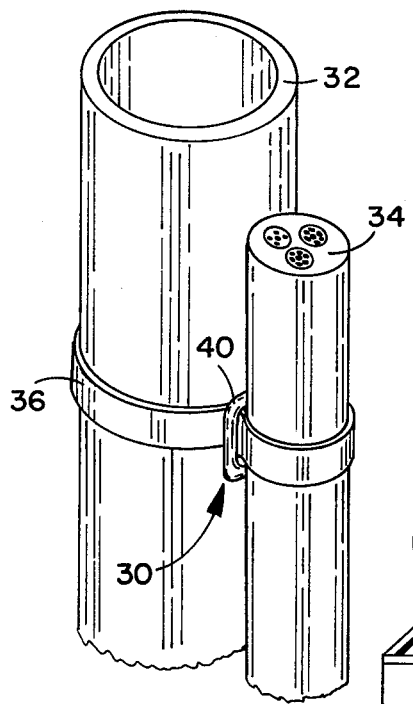
FIG. 4
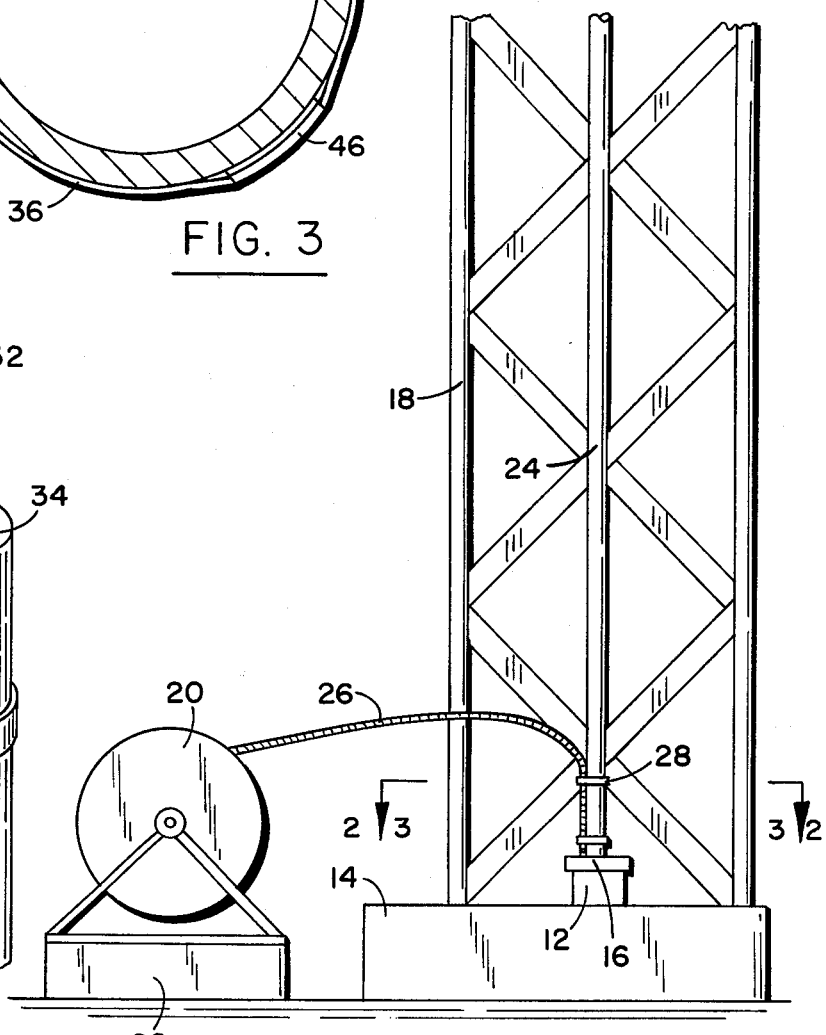
FIG. 1

CABLE BANDING LOCK RING

BACKGROUND

This invention is directed to a cable banding lock ring where an electric power supply cable is strapped to the side of a discharge pipe in deep well, submerged pump installations.

Most subterranean oil must be pumped from the ground. A casing extends from the surface down into the oil pool, and is perforated in the oil-producing zone to permit the oil to flow into the casing. A common oil recovery pump structure especially found in the older, shallower oil fields, is a surface pump jack which pulls the pump rod which extends to a pump cylinder in the oil down in the casing. An advantage of this structure is the fact that the motive unit is on the surface, and is easily accessible for maintenance. A disadvantage is the length of the pump rod string, which becomes very long for greater well depths.

Submersible pumps are now widely used for the recovery of oil. They comprise an electric motor-pump combination which is positioned in the lower portion of the casing in the oil pool therein. The discharge pipe string is directly connected to the pump to receive the pumped oil, and the pipe string also serves as a mechanical support for the pump and its motor. Of course, electric power must be supplied to the pump, and this is accomplished by a suitably shielded electric power cable which also extends down the casing, on the outside of the pipe string. In order to support the power cable, it is strapped to the outside of the pipe string with steel band straps.

SUMMARY OF THE INVENTION

In order to aid the understanding of this invention, it can be stated in essentially summary form that it is directed to a cable banding lock ring for embracing a strap which engages around both a pipe and an electric cable, between the pipe and electric power cable so that the lock ring increases the amount of wrap of the banding strap around both the electric power cable and the pipe.

It is, thus, an object of this invention to provide a cable banding lock ring which aids in the strapping of an electric power cable to the side of a pipe to improve the strapping retention of the cable with respect to the pipe. It is another object to provide a cable banding lock ring particularly suitable for strapping an electric power cable connected to a submersible pump to the side of the pump discharge pipe for use in submersible wells so that vibration reduces relative motion of the electric power cable with respect to the pipe to improve durability.

It is another object to provide a cable banding lock ring which is inexpensive and can be easily installed to enhance the reliability of strapping an electric power cable to the side of a discharge pipe, particularly in deep well installed submersible pumps.

Other objects and advantages of this invention will become apparent from a study of the following portion of this specification, the claims and the attached drawings.

BRIEF DESCRIPTION OF THE DRAWINGS

FIG. 1 is a schematic side-elevational view of an oil well head during insertion of the submerged pump with its discharge pipe and electric power cable.

FIG. 2 is an enlarged transverse section through the discharge pipe and electric power cable showing the prior art banding structure.

FIG. 3 is a view similar to FIG. 2, showing the cable banding lock ring of this invention in connection therewith.

FIG. 4 is an isometric view of the combination including the cable banding lock ring of this invention.

FIG. 5 is an isometric view of the cable banding lock ring of this invention, away from its installation position.

DESCRIPTION OF THE PREFERRED EMBODIMENT

FIG. 1 illustrates an installation where oil is removed from the ground by means of a submersible pump-motor combination submerged in the well casing. Well casing 12 extends up out of the ground from a subterranean zone of interest. Often, a work platform 14 is positioned around the casing. A top structure 16 is secured to the top of the casing and is a conventional structure. It may carry valving, flanges and the like. Sometimes, it is called a "Christmas Tree." When a submersible pump is to be installed or removed from the well casing 12, tower 18 is brought to the well head. Usually, the tower 18 is a portable structure and is used for servicing wells already in production. The work platform 14 may also be portable, brought to the site with the tower 18. Similarly, cable reel 20 is a portable structure, optionally on a truck or trailer frame 22 and is brought to the site as required.

The submersible pump-motor combination is positioned down in well casing 12 and is supported on the pipe string 24 which serves both as a discharge pipe for the pump and as a support for the pump-motor combination. In order to supply electric power to the electric motor, electric power cable 26 is supplied from cable drum 20.

As the pump is lowered into the casing with additions to the pipe string 24, cable 26 is unwound. In order to support the power cable, straps are placed to embrace both the pipe string 24 and power cable 26. As is seen in FIG. 2, banding strap 28 is conventionally employed. The banding straps are placed regularly along the length of the cable and pipe string in order to support the cable. The structure seen in FIG. 2 is conventional, and it is seen that the wrap of the banding strap around electric power cable 26 is minimal. As a result, vibration and other motion cause relative movement of the cable on its pipe string to result in wearing of the cable. A superior method of attachment is required. Banding strap 28 and its similar banding straps are of conventional steel strapping material and are applied by conventional strapping techniques.

The cable banding lock ring of this invention is generally indicated at 30 in FIGS. 3, 4, and 5. It is used in conjunction with pipe string 32, electric power cable 34, and banding strap 36. These structures are similar to pipe string 24, electric power cable 26, and banding strap 28.

Lock ring 30 is of generally rectangular configuration with an open center so that it has sides 38 and 40 as well as top 42 and bottom 44. It is formed of metal so as to be quite strong, and is preferably welded round steel wire. The circular cross-section is illustrated in FIG. 5.

Banding strap 36 is a conventional steel banding strap of rectangular cross-section. Its ends are pulled together by strapping equipment and are secured in clamp 46.

Before clamping, one or both ends of the banding strap 36 are free. As is seen in FIG. 4, the length of the sides 38 and 40 are sufficient to permit the banding strap 36 to lie therein, engaging interiorly of the sides. Furthermore, the length of the top and bottom 42 and 44, or the distance between the sides 38 and 40 is sufficient that, considering the curvature of the pipe the cable as well as the thickness of the banding strap 36, the cable substantially touches the pipe when the banding strap is tight within lock ring 30 and engaged tightly around both the cable and the pipe, as illustrated in FIG. 5.

In installation, as the cable is brought to the pipe as the pipe string is lowered, as illustrated in FIG. 1, the strap 36 has both of its ends passed around eiher the pipe or the cable, thence both of the ends pass through the lock ring 30 and thence both of the ends are inserted into the banding strapper by which the ends are pulled tight and the clamp 46 is attached. The clamp 46 preferably lies against the pipe 32 because of its greater radius, but if desired, can lie against cable 34. The advantage of the use of lock ring 30 is the increased wrap of the banding strap 36 around both the cable and the pipe. As previously done, as illustrated in FIG. 2, the wrap around the smaller of the 2 items is less than 180 degrees. However, with the employment of the lock ring 30, as illustrated in FIG. 3, the wrap around both the pipe string and the electric power cable is more than 180 degrees. In fact, in the proportions illustrated in FIG. 3, the wrap even around the cable 34, which is the smaller of the electric power cable and pipe string, is more than 270 degrees. This increased wrap minimizes the relative motion between the electric power cable 34 and the pipe string 32 to which it is strapped so that damage does not occur, as had previously occurred with the structure illustrated in FIG. 2. Thus, the increased wrap of banding strap 36 around the electric power cable and pipe string improve the stability and longevity of the combined structure.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A cable banding lock ring for embracing and retaining a banding strap which engages around two members which are banded together, said cable banding lock ring comprising:
a substantially rectangular metallic open-centered lock ring having first and second sides which are attached together and which are sufficiently long to embrace around the banding strap, said sides being spaced apart a distance smaller than the distance across one of the members so that, when said lock ring engages on the banding strap between the members strapped together with the banding strap, said lock ring pulls the banding strap into greater circumferential engagement with the members banded together.

2. The lock ring of claim 1 wherein said lock ring is of substantially circular cross-section.

3. A lock ring combination comprising:
first and second members lying substantially against each other;
a banding strap engaging around both of said first and second members for retaining them in position where they substantially lie against each other;
a lock ring engaging on said banding strap around said first and second members between said first and second members for increasing the length of engagement of the banding strap onto said first and second members to more securely hold said first and second members together.

4. The lock ring of claim 3 wherein said lock ring is a substantially rectangular lock ring having first and second sides for engagement on the outside of the banding strap to pull the banding strap together between the first and second members, said opening in said ring being sufficiently large to accept the banding strap therethrough.

5. A lock ring combination comprising:
first and second members for securement together, said first member being a well pipe and said second member being an electric cable, said pipe and said cable being substantially circular in section and touching substantially tangentially;
a steel banding strap engaging around said first and second members to hold said first and second members together; and
a substantially rectangular steel lock ring engaging around said banding strap between said first and second members to increase the wrap of said banding strap around both said first and second members, said lock ring pulling said banding strap toward said tangential engagement so that there is also solid contact between said pipe and said cable through said banding strap and lock ring on each side of said tangent contact point so that said cable is in contact with said pipe at three circumferentially spaced positions to securely attach together said first and second members.

6. The combination of claim 5 said lock ring is substantially rectangular and has an open center and is formed with its sides engaging said banding strap being of substantially circular cross-section.

* * * * *